United States Patent [19]

Mundy

[11] 3,958,329
[45] May 25, 1976

[54] CAST IRON PIPE CUTTER

[76] Inventor: Philip W. Mundy, 4 Vermont Ave., Port Monmouth, N.J. 07758

[22] Filed: May 22, 1975

[21] Appl. No.: 579,857

[52] U.S. Cl. .................................... 30/97; 30/277; 30/361; 30/367
[51] Int. Cl.² .................. B23D 21/12; B26B 27/00; B26D 3/16
[58] Field of Search ............... 30/97, 95, 96, 94, 93, 30/277, 361, 362, 367

[56] References Cited
UNITED STATES PATENTS

| | | |
|---|---|---|
| 2,271,582 | 2/1942 | Dixon ................................. 30/97 |
| 2,517,355 | 8/1950 | Runnells ........................... 30/94 X |
| 2,672,682 | 3/1954 | Studebaker et al. .................... 30/97 |
| 2,747,274 | 5/1956 | Willard et al. ........................ 30/97 |
| 3,497,261 | 2/1970 | Schares ........................... 30/277 X |

Primary Examiner—Othell M. Simpson
Assistant Examiner—J. T. Zatarga
Attorney, Agent, or Firm—Roger A. Clapp

[57] ABSTRACT

A tool for cutting cast-iron pipe is disclosed which includes inner and outer rings disposed annularly with respect to each other, a plurality of spring biased cutting pins reciprocally disposed in the inner ring, a plurality of cams disposed around the inner periphery of the outer ring and a motor mechanism for driving the rings relative to each other.

10 Claims, 5 Drawing Figures

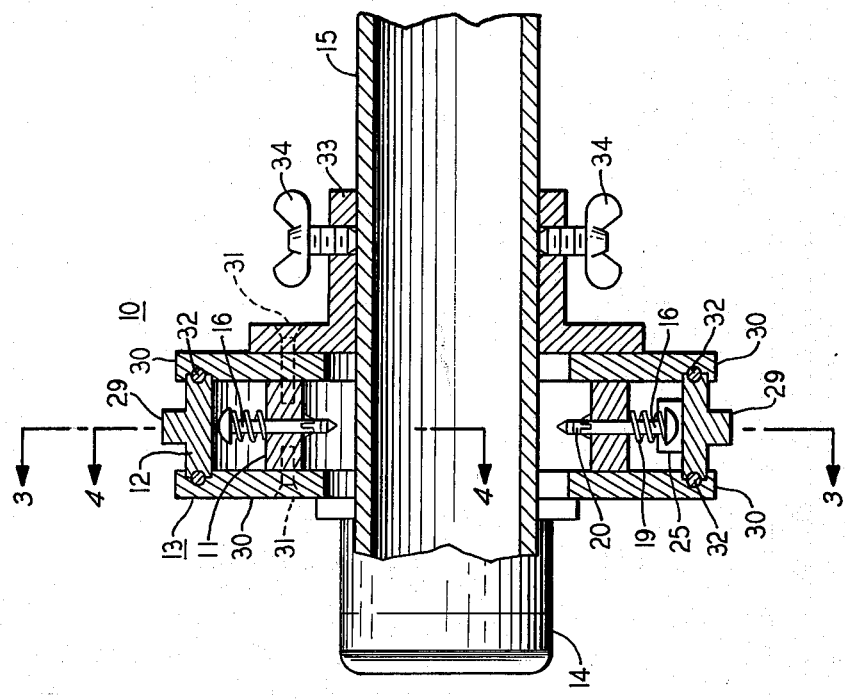
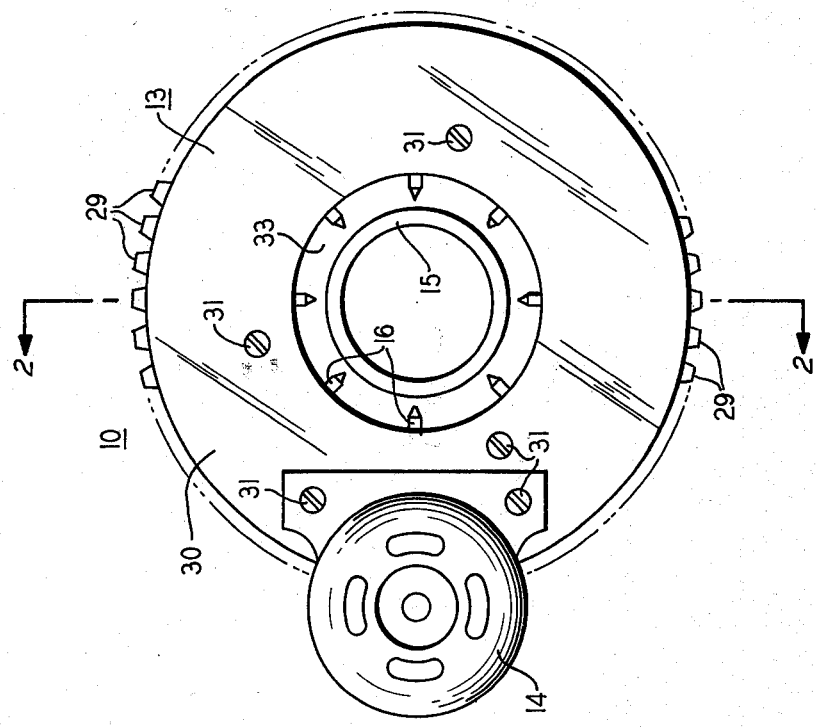

CAST IRON PIPE CUTTER

BACKGROUND OF THE INVENTION

1. Field of the Invention

This invention relates to motor driven cutting tools and pertains in particular to apparatus for percussively fracturing brittle pipe.

2. Description of the Prior Art

Pipe having walls made of a brittle material are widely used in the construction industry. In practice, the wall material is typically cast-iron. Cast-iron pipe has a variety of useful applications, but it is extremely difficult to cut with any degree of precision.

Devices for cutting cast-iron pipe are available, but they are generally not satisfactory. As a rule, the cutting operation results in an irregular break. Typically, such devices are manually operated, bulky, imprecise in the cutting function and often inefficient in operation.

Accordingly, the object of this invention is to achieve accurate cutting of cast-iron pipe in motor driven apparatus which is convenient, efficient and simple to use.

SUMMARY OF THE INVENTION

In accordance with the preferred embodiment of this invention, cam members cooperate with a rotating ring to achieve percussive cutting by driving a plurality of cutting pins against the outer wall of a pipe to be cut until fracture occurs.

In accordance with one feature of this invention, the cam members are affixed to a first ring, the drive pins are mounted reciprocally in a second ring and the first and second rings are disposed annularly, and rotate relative, to each other.

In accordance with another feature of this invention, one ring is fixed with respect to said pipe and the other ring includes peripheral gearing whereby motor drive is achieved.

In accordance with another feature of this invention, the cutting pins are radially disposed to form a common circumferencial line disposed tangent to the ends associated with said cam members and said cam members project through said common circumferencial line whereby each cam member strikes all drive pins as said rings rotate relative to each other thereby improving cutting efficiency.

In accordance with another feature of this invention, each cam member has a raised center portion bracketed by two end sections whereby said cam members can be utilized separately or as a part of a common mechanism.

These and other objects and features of the invention will be better understood by reference to the detailed description and drawing which follow.

BRIEF DESCRIPTION OF THE DRAWING

FIG. 1 is a front elevation view of an embodiment of this invention embracing a pipe to be cut.

FIG. 2 is an end elevation view of the embodiment illustrated in FIG. 1 taken in section along the lines 2—2;

DETAILED DESCRIPTION OF THE INVENTION

Figure 3:
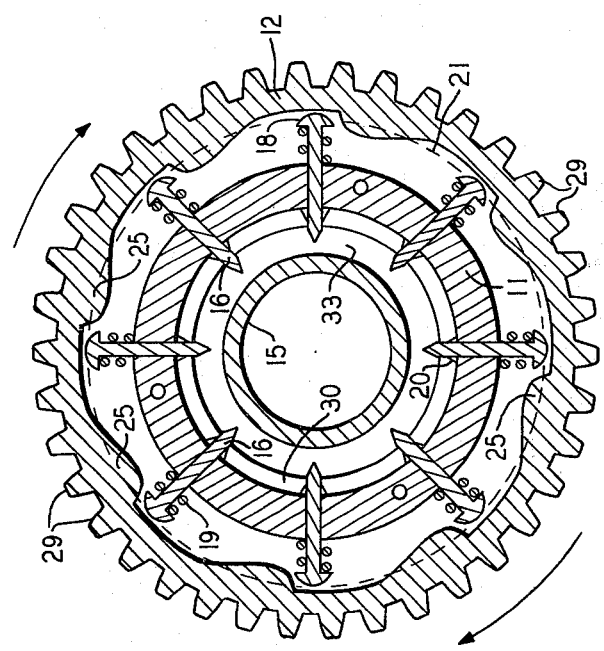
FIG. 3 is a front elevation view of the embodiment shown in FIGS. 1 and 2 taken in section along the line 3—3 in FIG. 2.

Referring to FIGS. 1, 2 and 3, a cutting tool 10 is disclosed which comprises an inner ring 11 an outer ring 12, a housing assembly 13 and a motor 14. Projecting through the cutting tool 10 is a pipe 15 which is to be cut.

Figure 5:
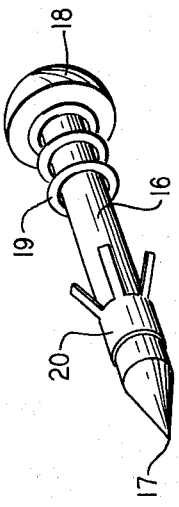
FIG. 5 is a perspective view of a typical cutting pin.

As best seen in FIG. 3, the inner ring 11 encircles the pipe 15 and includes a plurality of cutting pins 16 slidably mounted therein. As shown in FIG. 5, each cutting pin 16 has a cutting tip 17 and an anvil cap 18. In the embodiment illustrated, the cutting pin 16 also includes a compression spring 19 and a locking skirt 20. The cutting pins are adapted to percussively engage the walls of the pipe to be broken so they must be made of a strong material such as hardened steel. In addition, the cutting tip 17 is advantageously pointed to facilitate penetration of the pipe wall and the anvil cap 18 may be domed to facilitate contact with the driving mechanism.

As best seen in FIGS. 2 and 3, the cutting tips 17 are disposed to form an aperture adapted to accommodate the pipe 15. Similarly, the springs 19 urge the anvil caps 18 away from the inner ring 11 to a rest position where the highest point of each cap is tangent to a circumferencial line 21. The cutting pins 16 are symetrically disposed around the inner ring 11 and, although only eight are shown, any desired number may be used.

Figure 4:
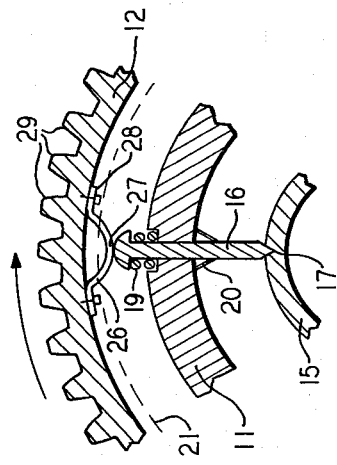
FIG. 4 is a fragmentary view taken in section along the line 4—4 in FIG. 2 to illustrate an alternate form of cam element.

As illustrated in FIG. 4, the inner ring 11 may be recessed to accept the springs 19 so as to permit greater travel toward the pipe 15 of the cutting pins 16 if desired. Similarly, to restrict movement of the cutting pins 16 away from the pipe 15, the skirt 20 is used. It will be recognized, however, that other means for restricting the reciprocal travel of the cutting pin 16 may be employed as desired.

The cutting pins 16 reciprocate in the inner ring 11 in response to energization by a plurality of cams 25. As best seen in FIGS. 3 and 4, the cams 25 are disposed on the inner periphery of the outer ring 12 and the outer ring 12 is disposed in an annular relationship to the inner ring 11 so as to form a space between the two which contains the circumferencial line 21. As best seen in FIG. 3, the cams 25 extend out from the outer ring 12 so as to project through the circumferencial line 21. As a result, the cams 25 will percussively engage the cutting pins 16 so as to drive them through the inner ring 11 as the outer ring rotates with respect to the inner ring.

In the illustrated embodiment, the cams 25 are an integral part of the outer ring 12. Moreover, each has a ramp shape to cooperate with the anvil caps 18 on the cutting pins 16. It will be recognized, however, that other shapes and designs may work equally well. Similarly, the number of cams 25 shown is the same as the number of cutting pin 16, but any number desired can be used.

In FIG. 4, the cam 25 is shown in alternate form as a spring cam 26 having a center portion 27 and two end sections 28. Again, the center portion 27 extends through the circumferencial line 21 and the two end sections 28 are affixed to the outer ring 12 as by riveting or by welding. Each spring cam 26 is made of a flexible material so tha the center portion 27 may deflect, if necessary, as it strikes an anvil cap 18.

It will be appreciated, however, that the spring members 26 can be joined to each other to form a single ring shaped member. That member, in turn, can be adapted for permanent mounting on the outer ring 12 as an entity as desired.

In the embodiment illustrated in FIGS. 3 and 4, the outer ring 12 rotates clockwise while the inner ring 11 is stationary. It will be recognized, however, that interaction between the cams 25 and the cutting pins 16 relies only upon appropriate relative movement between the rings. As best seen from FIGS. 1 and 3, the outer ring 12 rotates in response to energization by the motor 14. In the embodiment illustrated, the outer ring 12 includes gear teeth 29 disposed around its perimeter to engage a complementary drive gear (not shown) in the motor 14.

The housing assembly 13 holds the motor 14 and the inner and outer rings 11 and 12 in working relationship to each other and the pipe 15. As best seen in FIG. 2, it includes two side covers 30 which are rigidly attached to the inner ring 11 as by the screws 31. Advantageously, the side covers 30 are grooved to accommodate a bearing mechanism 32 which, in turn, cooperates with the outer ring 12 so as to permit ready rotation thereof.

As best seen in FIGS. 1 and 2, the motor 14 is mounted on one side cover 30 and a collar 33 is mounted on the other. For convenience, if desired, the screws 31 can be utilized to hold them in place where feasible. The collar 33 is adapted to snugly fit around the pipe 15 and has a locking arrangement to hold it in place; i.e., the wing screws 34. Alternative locking may also be used as, for example, a locking lever. Moreover, the side covers 30 can be fitted with suitable lubrication ports (not shown) where desired.

In operation, the cutting tool 10 is slipped over the pipe 15 until the cutting pins 16 are aligned with the desired point of fracture. Next, the wing screws 34 are tigthened to hold the cutting tool 10 in place. Finally, the motor 14 is energized.

When the motor 14 starts, the gear teeth 29 are driven so as to impart rotation to the outer ring 12. As the outer ring 12 rotates, the cams 25 drive into contact with the anvil caps 18 on the cutting pins 16. As a result, the impact slides the cutting pins 16 toward the pipe 15 where percussive contact is made.

When the cutting tips 17 strike the pipe 15, chipping occurs and any unused energy, together with that stored in the springs 19, urges the cutting pins 16 back toward their rest position so that the cycle can begin again. As best seen in FIG. 3, the distance between the highest point on the cams 25 and the outer wall of the pipe 15 exceeds the length of the cutting pins 16 so as to allow free reciprocation.

In summary, a motor driven cutting tool adapted for use on cast-iron pipe has been disclosed which is simple, efficient and easy to use. While the best embodiment has been disclosed, it is merely illustrative of the principals of the invention and it is recognized that others skilled in the art will readily achieve other embodiments which fall within the scope of the invention.

What I claim is:

1. In apparatus for cutting pipe, the combination comprising:

an inner ring having a plurality of spring-biased cutting pins disposed radially around it's perimeter in spoke-like relationship so as to form an aperture at their cutting tips adapted to accommodate the outer wall of the pipe to be cut, each of said cutting pins adapted to reciprocate in said inner ring and including a cutting tip, an anvil cap and means for urging said anvil cap away from said inner ring:

an outer ring disposed annularly with respect to said inner ring;

housing means for holding said rings in rotating relationship with each other, said holding means being adapted to hold one of said rings stationary with respect to said pipe to be cut;

motor means for rotating said rings relative to each other, and cam means affixed to the inner periphery of said outer ring so as to strike the anvil cap on each of said cutting pins on a point of percussion as said rings rotate relative to each other whereby the cutting tips on said cutting pins are driven against the outer wall of said pipe until fracture occurs.

2. The combination in accordance with claim 1 wherein said inner ring is stationary with respect to said pipe and said outer ring includes interconnecting means for engaging the driving portion of said motor means.

3. The combination in accordance with claim 2 wherein said motor means includes a drive gear and said interconnecting means includes a ring gear located on the outer periphery of said outer ring and adapted to engage said drive gear.

4. The combination in accordance with claim 1 wherein said cutting pins are disposed in said inner ring so that, at rest, the points of percussion on said anvil caps lie tangent to common circumferencial line and said cam means includes a plurality of elements disposed around the inner periphery of said outer ring, said elements being raised and projecting through said circumferencial line.

5. The combination in accordance with claim 4 wherein each element includes a center portion biased towards said inner ring.

6. The combination in accordance with claim 5 wherein each of said center portions is bracketed by two end sections wherein each end section bears on the inner periphery of said outer ring and holds said center portion in place.

7. The combination in accordance with claim 6 wherein said elements are all an integral part of a common structure.

8. The combination in accordance with claim 1 wherein each of said anvil caps forms a shoulder at the point of joinder with it's associated cutting pin and said means for urging said anvil caps away from said inner ring is a compression spring disposed between said shoulder and the outer periphery of said inner ring.

9. The combination in accordance with claim 8 wherein the periphery of said inner ring includes recesses to accommodate said compression springs.

10. The combination in accordance with claim 4 wherein the spacing between said elements and the outer wall of said pipe is greater than the length of said cutting pins.

* * * * *